(12) United States Patent
Kwan

(10) Patent No.: US 8,709,973 B2
(45) Date of Patent: Apr. 29, 2014

(54) IRREVERSIBLE THERMOCHROMIC INK COMPOSITIONS

(75) Inventor: Wing Sum Vincent Kwan, Chicago, IL (US)

(73) Assignee: Sanford, L.P., Oak Brook, IL (US)

( * ) Notice: Subject to any disclaimer, the term of this patent is extended or adjusted under 35 U.S.C. 154(b) by 98 days.

(21) Appl. No.: 13/342,015

(22) Filed: Dec. 31, 2011

(65) Prior Publication Data

US 2013/0172182 A1    Jul. 4, 2013

(51) Int. Cl.
     *B41M 5/30*      (2006.01)

(52) U.S. Cl.
     USPC ............................ 503/201; 503/213; 503/214

(58) Field of Classification Search
     USPC ........................................ 503/201, 213, 214
     See application file for complete search history.

(56) References Cited

U.S. PATENT DOCUMENTS

| | | |
|---|---|---|
| 3,516,941 A | 6/1970 | Matson |
| 3,560,229 A | 2/1971 | Farnham |
| 3,658,543 A | 4/1972 | Gerlach, Jr. et al. |
| 4,021,591 A | 5/1977 | DeVries et al. |
| 4,028,118 A | 6/1977 | Nakasuji et al. |
| 4,062,644 A | 12/1977 | Sponaes et al. |
| 4,162,165 A | 7/1979 | Schwab |
| 4,421,560 A | 12/1983 | Kito et al. |
| 4,425,161 A | 1/1984 | Shibahashi et al. |
| 4,547,429 A | 10/1985 | Greiner et al. |
| 4,550,676 A | 11/1985 | Francis |
| 4,620,941 A | 11/1986 | Yoshikawa et al. |
| 4,622,267 A | 11/1986 | Riecke |
| 4,720,301 A | 1/1988 | Kito et al. |
| 4,732,810 A | 3/1988 | Kito et al. |
| 4,865,648 A | 9/1989 | Kito et al. |
| 5,002,924 A | 3/1991 | Seitz |
| 5,128,308 A | 7/1992 | Talvalkar |
| 5,194,183 A | 3/1993 | Munch et al. |
| 5,248,652 A | 9/1993 | Talvalkar |
| 5,350,633 A | 9/1994 | Sumii et al. |
| 5,350,634 A | 9/1994 | Sumii et al. |
| 5,401,577 A | 3/1995 | Seitz |
| 5,500,040 A | 3/1996 | Fujinami |
| 5,527,385 A | 6/1996 | Sumii et al. |
| 5,558,699 A | 9/1996 | Nakashima et al. |
| 5,558,700 A | 9/1996 | Shibahashi et al. |
| 5,591,255 A | 1/1997 | Small et al. |
| 5,785,746 A | 7/1998 | Kito et al. |
| 5,786,838 A | 7/1998 | Steinhauser et al. |
| 5,873,932 A | 2/1999 | Fujita et al. |
| 5,879,438 A | 3/1999 | Fujita et al. |
| 5,879,443 A | 3/1999 | Senga et al. |
| 5,919,404 A | 7/1999 | Fujita et al. |
| 5,922,115 A | 7/1999 | Sano et al. |
| 5,997,849 A | 12/1999 | Small et al. |
| 6,004,900 A | 12/1999 | O'Brien, III |
| 6,048,387 A | 4/2000 | Shibahashi et al. |
| 6,139,779 A | 10/2000 | Small et al. |
| 6,251,571 B1 | 6/2001 | Dessauer et al. |
| 6,326,332 B1 | 12/2001 | Takayama |
| 6,413,305 B1 | 7/2002 | Mehta et al. |
| 6,494,950 B1 | 12/2002 | Fujita et al. |
| 6,638,620 B2 | 10/2003 | Nakashima et al. |
| 6,669,765 B2 | 12/2003 | Senga et al. |
| 6,700,125 B2 | 3/2004 | Ito et al. |
| 6,863,720 B2 | 3/2005 | Kitagawa et al. |
| 6,953,345 B1 | 10/2005 | Nakashima et al. |
| 6,964,168 B1 | 11/2005 | Pierson et al. |
| 7,168,876 B2 | 1/2007 | Nakashima et al. |
| 7,325,910 B2 | 2/2008 | Pelletier |
| 7,332,109 B2 | 2/2008 | Senga et al. |
| 7,335,624 B2 | 2/2008 | Senga et al. |
| 7,494,537 B2 | 2/2009 | Ono et al. |
| 7,575,386 B2 | 8/2009 | Shibahashi et al. |
| 7,632,564 B2 | 12/2009 | Nakashima |
| 7,708,913 B2 | 5/2010 | Fujita |
| 7,736,695 B2 | 6/2010 | Schwantes et al. |
| 8,182,596 B2 * | 5/2012 | Kurihara et al. ............ 106/31.32 |
| 2002/0107304 A1 | 8/2002 | Leu et al. |
| 2002/0170461 A1 | 11/2002 | Mehta et al. |
| 2003/0122123 A1 | 7/2003 | Deng et al. |
| 2004/0229754 A1 | 11/2004 | Fujita |
| 2006/0112851 A1 | 6/2006 | Ono et al. |
| 2007/0189836 A1 | 8/2007 | Senga et al. |

(Continued)

FOREIGN PATENT DOCUMENTS

| | | |
|---|---|---|
| DE | 10303914 A1 | 8/2004 |
| EP | 1149880 A1 | 10/2001 |
| EP | 1469046 A1 | 10/2004 |
| FR | 1223330 A | 6/1960 |
| WO | WO-01/04221 A1 | 1/2001 |

OTHER PUBLICATIONS

Muthyala (ed.), Chemistry and Applications of Leuco Dyes, Topics in Applied Chemistry, Plenum Press (1997).
International Search Report and Written Opinion for corresponding international application No. PCT/US2012/070573, mailing date Mar. 4, 2013.

(Continued)

*Primary Examiner* — Bruce H Hess
(74) *Attorney, Agent, or Firm* — Marshall, Gerstein & Borun LLP

(57) ABSTRACT

Disclosed herein are irreversible thermochromic ink compositions including a volatile color activator and a color change dye capable of becoming substantially colorless upon evaporation of the volatile color activator. The volatile color activator and the color change dye can be, optionally, encapsulated. Written marks made with the thermochromic ink compositions can be subjected to a force directing component, which can include generating heat and/or friction, to evaporate the volatile color activator, thereby causing the color change dye to become substantially colorless.

19 Claims, No Drawings

(56) References Cited

U.S. PATENT DOCUMENTS

| | | |
|---|---|---|
| 2007/0251912 A1 | 11/2007 | Sixou et al. |
| 2008/0113862 A1 | 5/2008 | Stovold et al. |
| 2008/0124164 A1 | 5/2008 | Ito et al. |
| 2008/0292385 A1 | 11/2008 | Wase et al. |
| 2009/0050013 A1 | 2/2009 | Fujita |
| 2009/0071370 A1 | 3/2009 | Nakashima |
| 2010/0012018 A1 | 1/2010 | Ribi |
| 2010/0098475 A1 | 4/2010 | Fujita et al. |
| 2010/0098476 A1 | 4/2010 | Imamura et al. |
| 2010/0120614 A1 | 5/2010 | Ono |
| 2010/0275813 A1 | 11/2010 | Kurihara et al. |

OTHER PUBLICATIONS

Matsui Shikiso Chemical Co., Ltd, Technical Data Sheet for Thermolock AQ Ink #79 (Aug. 5, 2009).

* cited by examiner

IRREVERSIBLE THERMOCHROMIC INK COMPOSITIONS

FIELD OF THE DISCLOSURE

The disclosure is generally related to irreversible thermochromic ink compositions and, more particularly, to irreversible thermochromic ink compositions including a volatile color activator and a color change dye capable of becoming substantially colorless upon evaporation of the volatile color activator.

BACKGROUND

Thermochromic inks change color in response to changes in temperature. Known thermochromic inks often include leuco dyes as the color changing component. Leuco dyes typically exist in two different forms, a colored form and a substantially colorless form. Leuco dyes which change forms in response to local changes in pH are typically used in known thermochromic inks. The change in pH can be brought about in such systems by contacting the leuco dye with a color activator/developer which can induce proton transfer to the leuco dye and thereby cause the leuco dye to adopt its colored form, but similar color changes from substantially colorless to colored can also result from electron transfer and/or proton transfer reactions. From a structural standpoint, the change from substantially colorless to colored is often induced by cleaving a lactone ring to form a more highly conjugated species that absorbs in the visible range. The reverse change from colored to substantially colorless can then be brought about by proton abstraction and reformation of the lactone ring.

Known thermochromic inks often exhibit 'hysteresis' associated with the color change, i.e., the color change of written marks made with such inks is reversible. One representative example, U.S. Pat. No. 5,558,699, discloses a thermochromic color-memory composition comprising a homogeneous solubilized mixture of three essential components including (a) an electron-donating color-developing organic compound, (b) an electron-accepting compound, and (c) a reaction medium for controlling the reaction of (a) with (b). The thermochromic compositions of the '699 patent change color with a large hysteresis width (ΔH) of from 8° C. to 80° C. As a result, written marks made using the thermochromic inks typically exhibit a colored state at room temperature, change from the colored state to substantially colorless upon application of heat (i.e., heat can be applied to a substrate to erase written marks previously made thereon), and change back to the initial colored state when cooled below a certain temperature (i.e., the substrate is cooled, thereby 're-forming' the color of the written marks). Thus, known thermochromic inks typically include a reaction medium which can promote or impede the reaction between the leuco dye and the activator at certain temperatures, such that the leuco dye is present in its colorless form at certain temperatures which are typically substantially above room temperature.

The reversibility of the color change can be particularly undesirable in certain situations, for example, if the consumer does not wish for the original written marks to be 're-revealed.'

SUMMARY

Disclosed herein are irreversible thermochromic ink compositions including a volatile color activator and a color change dye capable of becoming substantially colorless upon evaporation of the volatile color activator. The ink typically further includes a solvent, a resin, or a mixture thereof.

In one aspect, an irreversible thermochromic ink includes a carrier and thermochromic capsules dispersed in the carrier, the thermochromic capsules comprising a shell and a core, the core comprising a volatile color activator and a color change dye capable of becoming substantially colorless upon evaporation of the volatile color activator. The carrier typically includes a solvent, a resin, or a mixture thereof. The shell is preferably frangible, i.e., the shell ruptures (rather than is plastically deformed) when pressure is applied thereto. Like the carrier, the core can also further include therein a solvent, a resin, or a mixture thereof, for example, to stabilize, solvate, and/or disperse the volatile color activator and the color change dye.

In another aspect, an irreversible thermochromic ink compositions includes a carrier, a volatile color activator, and a color change dye capable of becoming substantially colorless upon evaporation of the volatile color activator, both the volatile color activator and the color change dye being (directly) dissolved and/or dispersed in a carrier. According to this aspect, the volatile color activator and color change dye are not encapsulated, i.e., the thermochromic ink according to the disclosure may exclude irreversible thermochromic pigment capsules as disclosed herein. The carrier typically includes a solvent, a resin, or a mixture thereof.

Also disclosed herein is an irreversible thermochromic ink capsule including a shell and a core, the core comprising a volatile color activator and a color change dye capable of becoming substantially colorless upon evaporation of the volatile color activator. The core can include a solvent, a resin, or a mixture thereof. The shell is preferably frangible, i.e., the shell ruptures (rather than is plastically deformed) when pressure is applied thereto.

Also disclosed is a method of erasing a written mark including (i) making a written mark on a substrate with an irreversible thermochromic ink comprising a carrier and thermochromic capsules dispersed in the carrier, the thermochromic capsules comprising a shell and a core, the core comprising a volatile color activator and a color change dye capable of becoming substantially colorless upon evaporation of the volatile color activator, the written mark providing a coating comprising a plurality of the thermochromic capsules on the substrate, and (ii) applying a force directing component to the written mark to form ruptured thermochromic capsules, thereby allowing the volatile color activator of the ruptured thermochromic capsules to evaporate therefrom such that the color change dye of the ruptured thermochromic capsules becomes substantially colorless (i.e., changes from colored to substantially colorless) and thereby "erase" the written mark. The core preferably comprises a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. A heat source may also be applied to the written mark to assist in the erasure process.

In another aspect, a method of erasing a written mark includes (i) making a written mark on a substrate with an irreversible thermochromic ink including a carrier, a volatile color activator, and a color change dye capable of becoming substantially colorless upon evaporation of the volatile color activator, both the volatile color activator and the color change dye being (directly) dissolved and/or dispersed in a carrier, the written mark providing a coating comprising the irreversible thermochromic ink on the substrate, and (ii) heating the written mark to a temperature sufficient to cause the volatile color activator to evaporate therefrom such that the color change dye becomes substantially colorless (i.e., changes from colored to substantially colorless) and thereby "erase" the written mark. According to this aspect, the volatile color activator and color change dye are not encapsulated, i.e., the irreversible thermochromic ink according to this aspect of the disclosure may exclude irreversible thermochromic pigment capsules as disclosed herein. The ink composition solvent is typically a volatile solvent. The ink composition may further include a resin dissolved or dispersed in the solvent. Heating of the written mark may be effected by application of a force directing component to the written mark, application of a heat source, or a combination thereof.

Also disclosed are writing instruments containing irreversible thermochromic ink compositions including a volatile color activator and a color change dye capable of becoming substantially colorless upon evaporation of the volatile color activator.

In one aspect, the writing instrument includes an irreversible thermochromic ink comprising a carrier and thermochromic capsules dispersed in the carrier, the thermochromic capsules comprising a shell and a core, the core comprising a volatile color activator and a color change dye capable of becoming substantially colorless upon evaporation of the volatile color activator. The core preferably includes a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. Writing instruments comprising a writing point in fluid communication with an ink reservoir such as ball point pens, fountain pens, and markers can be used.

In another aspect, the writing instrument includes an irreversible thermochromic ink comprising a carrier, a volatile color activator, and a color change dye capable of becoming substantially colorless upon evaporation of the volatile color activator, both the volatile color activator and the color change dye being (directly) dissolved and/or dispersed in a carrier. According to this aspect, the volatile color activator and color change dye are not encapsulated, i.e., the irreversible thermochromic ink according to this aspect of the disclosure may exclude irreversible thermochromic pigment capsules as disclosed herein. The carrier typically comprises a volatile solvent. The ink composition may further include a resin dissolved or dispersed in the solvent. Writing instruments comprising a writing point in fluid communication with an ink reservoir such as ball point pens, fountain pens, and markers can be used.

DETAILED DESCRIPTION

Disclosed herein are irreversible thermochromic ink compositions, methods of making and using the irreversible thermochromic ink compositions, and irreversible thermochromic pigment capsules. The disclosed irreversible thermochromic ink compositions include a volatile color activator and a color change dye capable of becoming substantially colorless upon evaporation of the volatile color activator. The irreversible thermochromic pigment capsules and irreversible thermochromic inks according to the disclosure are capable of irreversibly changing color, for example, upon application of frictional forces during an erasure process. Such a color change is advantageously irreversible, even upon cooling.

A written mark can be made on a substrate using the irreversible thermochromic ink compositions disclosed herein. The written mark can be subjected to pressure, for example, by applying a force directing component, such as a conventional eraser, over and/or about the written mark. Where the volatile color activator and the color change dye are encapsulated, application of the force directing component will rupture the thermochromic capsules enabling the volatile color activator to be released from the capsules and exposed to atmospheric conditions. Additionally, whether or not the ink includes such thermochromic capsules, application of the force directing component to the written mark will generate heat or friction thus promoting evaporation of the volatile color activator. Upon evaporation of the volatile color activator, the color change dye will become irreversibly and substantially colorless and thus any written marks will be "erased", as further described below.

In one aspect, an irreversible thermochromic ink includes a carrier and thermochromic capsules dispersed in the carrier, the thermochromic capsules comprising a shell and a core, the core comprising a volatile color activator and a color change dye capable of becoming substantially colorless upon evaporation of the volatile color activator. The carrier typically includes a solvent, a resin, or a mixture thereof. The shell provides a continuous, exterior surface that encapsulates and contains the core components which are typically liquid. The shell is preferably frangible, i.e., the shell ruptures (rather than is plastically deformed) when pressure is applied thereto. Like the carrier, the core can also further include therein a solvent, a resin, or a mixture thereof, for example, to stabilize, solvate, and/or disperse the volatile color activator and the color change dye.

In another aspect, an irreversible thermochromic ink compositions includes a carrier, a volatile color activator, and a color change dye capable of becoming substantially colorless upon evaporation of the volatile color activator, both the volatile color activator and the color change dye being (directly) dissolved and/or dispersed in a carrier. According to this aspect, the volatile color activator and color change dye are not encapsulated, i.e., the irreversible thermochromic ink according to this aspect of the disclosure may exclude irreversible thermochromic pigment capsules as disclosed herein. The carrier typically includes a solvent, a resin, or a mixture thereof.

Also disclosed herein is an irreversible thermochromic ink capsule including a shell and a core, the core comprising a volatile color activator and a color change dye capable of becoming substantially colorless upon evaporation of the volatile color activator. The core typically further includes a solvent, a resin, or a mixture thereof. The shell provides a continuous, exterior surface that encapsulates and contains the core components which are typically liquid. The shell is preferably frangible, i.e., the shell ruptures (rather than is plastically deformed) when pressure is applied thereto.

Also disclosed is a method of erasing a written mark including (i) making a written mark on a substrate with an irreversible thermochromic ink comprising a carrier and thermochromic capsules dispersed in the carrier, the thermochromic capsules comprising a shell and a core, the core comprising a volatile color activator and a color change dye capable of becoming substantially colorless upon evaporation of the volatile color activator, the written mark providing a coating comprising a plurality of the thermochromic capsules on the substrate, and (ii) applying a force directing component to the written mark to form ruptured thermochromic capsules, thereby allowing the volatile color activator of the ruptured thermochromic capsules to evaporate therefrom such that the color change dye of the ruptured thermochromic capsules becomes substantially colorless (i.e., changes from colored to substantially colorless) and thereby "erase" the written mark.

The core preferably comprises a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. A heat source may also be applied to the written mark to assist in the erasure process.

In another aspect, a method of erasing a written mark includes (i) making a written mark on a substrate with an irreversible thermochromic ink including a carrier, a volatile color activator, and a color change dye capable of becoming substantially colorless upon evaporation of the volatile color activator, both the volatile color activator and the color change dye being (directly) dissolved and/or dispersed in a carrier, the written mark providing a coating comprising the irreversible thermochromic ink on the substrate, and (ii) heating the written mark to a temperature sufficient to cause the volatile color activator to evaporate therefrom such that the color change dye becomes substantially colorless (i.e., changes from colored to substantially colorless) and thereby "erase" the written mark. According to this aspect, the volatile color activator and color change dye are not encapsulated, i.e., the irreversible thermochromic ink according to this aspect of the disclosure may exclude irreversible thermochromic pigment capsules as disclosed herein. The ink composition solvent is typically a volatile solvent. The ink composition may further include a resin dissolved or dispersed in the solvent. Heating of the written mark may be effected by application of a force directing component to the written mark, application of a heat source, or a combination thereof.

Also disclosed are writing instruments containing irreversible thermochromic ink compositions including a volatile color activator and a color change dye capable of becoming substantially colorless upon evaporation of the volatile color activator.

In one aspect, the writing instrument includes an irreversible thermochromic ink comprising a carrier and thermochromic capsules dispersed in the carrier, the thermochromic capsules comprising a shell and a core, the core comprising a volatile color activator and a color change dye capable of becoming substantially colorless upon evaporation of the volatile color activator. The core preferably includes a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. Writing instruments comprising a writing point in fluid communication with an ink reservoir such as ball point pens, fountain pens, and markers can be used.

In another aspect, the writing instrument includes an irreversible thermochromic ink comprising a carrier, a volatile color activator, and a color change dye capable of becoming substantially colorless upon evaporation of the volatile color activator, both the volatile color activator and the color change dye being (directly) dissolved and/or dispersed in a carrier. According to this aspect, the volatile color activator and color change dye are not encapsulated, i.e., the irreversible thermochromic ink according to this aspect of the disclosure may exclude irreversible thermochromic pigment capsules as disclosed herein. The carrier typically comprises a volatile solvent. The ink composition may further include a resin dissolved or dispersed in the solvent. Writing instruments comprising a writing point in fluid communication with an ink reservoir such as ball point pens, fountain pens, and markers can be used.

As used herein, the term "irreversible thermochromic" refers to an ink composition capable of undergoing a color change that cannot be reversed by application of a temperature change or an ink capsule including an ink composition capable of undergoing a color change that cannot be restored/reversed by application of a temperature change. As a result, the disclosed thermochromic ink compositions cannot exhibit hysteresis (at least upon evaporation of the volatile color activator component(s)) and are generally considered to be erasable.

As mentioned above, the irreversible thermochromic ink compositions include a volatile color activator and a color change dye capable of becoming substantially colorless upon evaporation of the volatile color activator. As a result of including this combination, the ink compositions and written markings made with the ink compositions are initially colored but become substantially colorless after evaporation of the volatile color activator.

In irreversible thermochromic ink compositions not including thermochromic capsules as disclosed herein, evaporation of the volatile color activator component generally commences immediately after a written mark is made, i.e., after the written mark and associated volatile color activator are exposed to atmospheric conditions. Upon evaporation of the volatile color activator component, the color change dye of the thermochromic ink composition becomes substantially colorless (i.e., changes from colored to substantially colorless).

In irreversible thermochromic ink compositions including irreversible thermochromic pigment capsules as disclosed herein, evaporation of the volatile color activator component generally commences after a force directing component is applied to the written mark (which includes a coating comprising a plurality of the irreversible thermochromic pigment capsules) to form ruptured irreversible thermochromic pigment capsules. By rupturing the irreversible thermochromic pigment capsules, the core contents including the volatile color activator component are exposed to atmospheric conditions such that the volatile color activator component can evaporate therefrom. Upon evaporation of the volatile color activator component, the color change dye of the ruptured thermochromic capsules becomes substantially colorless (i.e., changes from colored to substantially colorless).

In both irreversible thermochromic ink compositions (including and not including the irreversible thermochromic pigment capsules), the rate of volatile color activator evaporation can be increased, for example, by subjecting the written marking (and thus any volatile color activator component associated therewith) to friction and/or elevated temperature, i.e., conditions which promote evaporation of the volatile color activator component. Thus, written marks can be made with the irreversible thermochromic ink composition on a substrate and then rendered a different color or substantially colorless, for example, by an erasure process. The erasure process can include the application of a frictional force to the written marks, so as to effect heating at the area of contact (i.e., increase the temperature) and also rupture any irreversible thermochromic pigment capsules present in the written marks. Frictional forces can be applied, for example, using a force directing component such as a conventional eraser. Any material capable of applying a friction force to a substrate can be a suitable force directing component to rupture and/or heat the irreversible thermochromic pigment capsules, including but not limited to rubber, thermoplastic materials, thermoplastic elastomers, metals, and wood can be used. Alternatively, the erasure process can include heating the written mark without or in combination with the application of a friction force. The written mark can be heated in any known way including directing a light or laser thereon, directing heated air thereover, applying a heated element such as a heated block element (e.g., an ironing element), etc.

Significantly, in both irreversible thermochromic ink compositions (including and not including the irreversible thermochromic pigment capsules), upon evaporation of the volatile color activator component, the written marks undergo an irreversible color change from a first colored state to a second colored state (in one preferred aspect, the second colored state is substantially colorless). As a result, once written markings made with these irreversible thermochromic ink compositions have lost their initial coloring, their initial color cannot be restored by cooling the markings (or the substrate which previously carried the markings), for example, because the irreversible thermochromic ink compositions cannot exhibit thermal hysteresis in association with a temperature change after the volatile color activator has evaporated therefrom and is no longer present to cause the selected color change dye as disclosed herein to be in its colored form. In preferred embodiments, the ink compositions do not contain any colorant other than the color change dye capable of becoming substantially colorless upon evaporation of the volatile color activator. As a result, the color of the written markings made in accordance with the disclosure changes upon application of frictional force and/or heat can change from colored to substantially colorless (because the irreversible thermochromic ink compositions exclude additional colorants). Of course, if at least one additional colorant that persists despite application of frictional forces and/or heat is included in the irreversible thermochromic ink compositions, the color of the written marking will change from a first colored state to a second colored state (the second colored state being attributable to the additional colorant(s)). Any number of conventional pigments and dyes could be used as the additional colorant that persists despite application of frictional forces and/or heat.

Typically, the irreversible thermochromic ink compositions include at least 1 weight percent (wt. %), at least 5 wt. % and/or at least 10 wt. % of the color change dye in the ink composition based on the total weight of the irreversible thermochromic ink composition. For example, the amount of color change dye present in the irreversible thermochromic ink composition is typically between about 1 wt. % and about 25 wt. %, between about 2.5 wt. % and about 20 wt. %, and/or between about 5 wt. % and about 17.5 wt. % based on the total weight of the irreversible thermochromic ink composition. The amount of color change dye in the ink compositions should be upwardly adjusted in view of the transparency of the thermochromic capsule shell (if encapsulated). Thus, the amount of color change dye is typically somewhat greater in ink compositions including the irreversible thermochromic pigment capsules as disclosed herein relative to irreversible thermochromic ink compositions not including irreversible thermochromic pigment capsules.

Typically, the irreversible thermochromic ink compositions include at least 1 weight percent (wt. %), at least 5 wt. %, at least 10 wt. %, and/or at least 20 wt. % of the volatile color activator in the ink composition based on the total weight of the irreversible thermochromic ink composition. For example, the amount of the volatile color activator present in the irreversible thermochromic capsule is typically between about 1 wt. % and about 55 wt. %, between about 5 wt. % and about 50 wt. %, and/or between about 10 wt. % and about 45 wt. % based on the total weight of the irreversible thermochromic capsule. Like the amount of color change dye, the amount of the volatile color activator should be upwardly adjusted in view of the transparency of the irreversible thermochromic capsule shell (if encapsulated).

To achieve a substantial degree of color activation, the weight ratio of volatile color activator to color change dye is preferably at least 1:1, for example, at least 2:1 and/or least 4:1 in the irreversible ink compositions. The amount of color activator present in the irreversible thermochromic ink compositions can be easily adjusted by one having ordinary skill such that its concentration does not unduly influence the time needed for the volatile color activator to evaporate (and thus the substantial disappearance of color as the color change dye changes from colored to substantially colorless).

Volatile Color Activator

As used herein, the term "volatile color activator" refers to any volatile compound or mixture of such compounds that causes a color change dye to exhibit color when in the presence of the volatile color activator compound. Thus, the color change dye is substantially colorless in the absence of a volatile color activator. The volatile color activator is selected to have a relatively low boiling point to facilitate evaporation thereof. For example, the volatile color activator typically has a boiling point less than about 300° C., such as less than about 250° C., less than about 200° C., less than about 180° C., less than about 160° C., less than about 140° C., less than about 120° C., and/or less than about 100° C. For example, the boiling point can be between about 50° C. and about 300° C., between 100° C. and about 300° C., between about 50° C. and about 280° C., between about 100° C. and about 280° C., and/or between about 50° C. and about 200° C. As a result, the volatile color activators typically have a low enthalpy of vaporization value. For example, the volatile color activator typically has a relatively low enthalpy of vaporization value, typically less than about 75 kJ/mol, less than about 65 kJ/mol, and/or less than about 60 kJ/mol.

Suitable volatile color activators include but are not limited to volatile phenolic compounds (i.e., volatile compounds including a phenolic moiety). The volatile phenolic compounds can be substituted, for example, with an alkyl moiety (which may be straight chained or branched) or an aryl moiety. The alkyl and aryl moieties can include one or more substituents selected from the group consisting of nitro, cyano, amino, hydroxyl, halogen, alkyl, haloalkyl, alkoxyalkyl groups, aryloxy groups and alkoxy groups. Exemplary volatile color activators include but are not limited to, for example, p-cresol; m-cresol; o-cresol; p-ethylphenol; m-ethylphenol; o-ethylphenol; p-octylphenol; p-tert-butylphenol; 1,1-bis(p-hydroxyphenyl) propane; 2,2-bis(p-hydroxyphenyl) propane; 1,1-bis(p-hydroxyphenyl) cyclohexane; 4,4-thiobisphenol; 4,4-sulfonyldiphenol; bis(3-allyl 4-hydroxphenyl)sulfone; nonylphenol; 4-tert-amylphenol; 2-phenylphenol; 3-(hydroxymethyl) phenol; 4-(hydroxymethyl) phenol; 4-hydroxy-3-methoxybenzaldehyde; and 1-(4-hydroxy-3-methoxyphenyl) ethanone. Other useful color activators including a phenolic moiety include but are not limited to vanillins (including various derivatives thereof), (other) cresols (including derivatives thereof), xylenols (including derivatives thereof), trimethylphenols (including derivatives thereof), napthols (including derivatives thereof), halogen substituted-phenols (including various derivatives thereof), and the like.

Color Change Dye

As used herein, the term "color change dye" refers to a dye such as a leuco dye, which can exhibit a first color in the presence of a volatile color activator and exhibit a second color or become substantially colorless when the volatile color activator is not present. As a result, the color change dye is initially in its colored form at room temperature. The color change from colored to substantially colorless can result from electron transfer and/or proton transfer reactions. The change in color is often induced by cleaving a lactone ring to form a more highly conjugated species that absorbs in the visible range. Suitable dyes include but are not limited to dyes such as xanthene leuco dyes, thioxanthene leuco dyes, acridine leuco dyes, phenoxazine leuco dyes, phenazine leuco dyes, merocyanine leuco dyes, thiazine leuco dyes, oxazine leuco dyes, azine leuco dyes, methine leuco dyes, azo leuco dyes, pyrazoline leuco dyes, stilbene leuco dyes, coumarin leuco dyes, triarylmethane leuco dyes (including but not limited to phenylmethanes such as diphenylmethanes, triphenylmethanes, aminotriarylmethanes, and bisphenylmethanes), spiropyran leuco dyes, phthalide leuco dyes (including but not limited to diarylphthalides and indolylphthalides), fluoran leuco dyes, acylleucoazine dyes, leucoauramine dyes, rhodaminelactam leuco dyes, chromene leuco dyes, quinine leuco dyes, aminohydrocinnamic acid leuco dyes (including but not limited to cyanoethanes and leuco methines) and their corresponding esters, 2-(p-hydroxyphenyl)-4,5-diphenylimidazole leuco dyes, indanone leuco dyes, indamine leuco dyes, hydrozine leuco dyes, indigoid leuco dyes, amino-2,3-dihydroanthraquinone leuco dyes, tetrahalo-p,p'-biphenol leuco dyes, phenethylaniline leuco dyes, and mixtures thereof.

Exemplary fluoran based leuco dyes include, for example, 3-diethylamino-6-methyl-7-anilinofluoran; 3-(N-ethyl-p-toluidino)-6-methyl-7-anilinofluoran; 3-(N-ethyl-N-isoamylamino)-6-methyl-7-anilinofluoran; 3-diethylamino-6-methyl-7-(o, p-dimethylanilino) fluoran; 3-pyrrolidino-6-methyl-7-anilinofluoran; 3-piperidino-6-methyl-7-anilinofluoran; 3-(N-cyclohexyl-N-methylamino)-6-methyl-7-anilinofluoran; 3-diethylamino-7-(m-trifluoromethylanilino) fluoran; 3-dibutylamino-6-methyl-7-anilinofluoran; 3-diethylamino-6-chloro-7-anilinofluoran; 3-dibutylamino-7-(o-chloroanilino) fluoran; 3-diethylamino-7-(o-chloroanilino) fluoran; 3-di-n-pentylamino-6-methyl-7-anilinofluoran; 3-di-n-butylamino-6-methyl-7-anilinofluoran; 3-(n-ethyl-n-isopentylamino)-6-methyl-7-anilinofluoran; 3-pyrrolidino-6-methyl-7-anilinofluoran; 1 (3H)-isobenzofuranone, 4,5,6,7-tetrachloro-3,3-bis[2-[4-(dimethylamino)phenyl]-2-(4-methoxyphenyl)ethenyl]; and mixtures thereof.

Exemplary aminotriarylmethane leuco dyes include, for example, tris(N,N-dimethylaminophenyl) methane (LCV); deutero-tris(N,N-dimethylaminophenyl)methane (D-LCV); tris(N,N-diethylaminophenyl) methane (LECV); deutero-tris (4-diethylaminophenyl) methane (D-LECV); tris(N,N-di-n-propylaminophenyl) methane (LPCV); tris(N,N-di-n-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); deutero-bis(4-diethylaminophenyl)-(4-diethylamino-2-methylphenyl) methane (D-LV-1); deutero-bis(4-diethylamino-2-methylphenyl)(4-diethylaminophenyl) methane (D-LV-2); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1-C4 alkyl; and aminotriarylmethane leuco dyes based on any of the preceding structures that are further substituted with one or more alkyl groups on the aryl rings wherein the latter alkyl groups are independently selected from C1-C3 alkyl.

Suitable color change dyes are commercially available under the PERGASCRIPT® trade name (Ciba-Geigy Corporation, Greensboro, N.C.) and under the COPIKEM® trade name (Hilton Davis Company, Cincinnati, Ohio). Specific exemplary color change dyes include crystal violet lactone, malachite green lactone, PERGASCRIPT® red I-6B (a bis-indolyl phthalide dye), PERGASCRIPT® black I-2R (a diamino fluoran dye), PERGASCRIPT® I-2G (a xanthene dye), COPIKEM® 1 Blue CVL (crystal violet lactone), Vermilion-DCF (Hodogaya Chemical (USA) Inc.), Red-DCF (Hodogaya Chemical (USA) Inc.), and Orange-DCF (Hodogaya Chemical (USA) Inc.).

A number of leuco dyes and their chemistries are disclosed in Muthyala, "Chemisty and Application of Leuco Dyes," Topics in Applied Chemistry, Plenum Press, New York (1997), which is incorporated herein by reference in its entirety. Additional color changes dyes are disclosed, for example, in U.S. Pat. No. 3,658,543 and U.S. Pat. No. 6,251,571, each of which is also incorporated herein by reference in its entirety.

In another aspect, when the color change dye is present in a thermochromic capsule, the color change dye can be a pH sensitive dye that is colored under either basic or acidic conditions, and changes from colored to substantially colorless according to a local change in pH that is caused by evaporation of a volatile acid or base. Thus, in this aspect, the volatile color activator is a volatile acid or base.

Suitable pH sensitive dyes that are colored under basic conditions include, for example, phthalein-type dyes, such as o-cresolphthalein, phenolphthalein, and thymolphthalein, and phenol-type dyes, such as m-nitrophenol and p-nitrophenol, cyanine, and bis-(2,4-dinitro-phenyl)acetic acid ethyl ester. Suitable pH sensitive dyes that are colored under acidic conditions include, for example, phthalide-type color-forming dyes, such as diarylphthalide dyes and indolylphthalide dyes, fluoran dyes, leuco dyes, such as acylleucoazine dyes and leucoauramine dyes, spiropyrane dyes, rhodaminelactam dyes, triarylmethane dyes, and chromene dyes. Suitable color change dyes that are colored under acidic conditions include but are not limited to phthalide-type color-forming dyes such as diarylphthalide dyes and indolylphthalide dyes, fluoran dyes, leuco dyes such as acylleucoazine dyes and leucoauramine dyes, spiropyrane dyes, rhodaminelactam dyes, triarylmethane dyes, and chromene dyes.

Exemplary volatile bases for use as the volatile color activator in combination with the foregoing pH sensitive dyes include dimethylamino-2-propanol, ammonia, and alkylamines including but not limited to propylamine, butylamine, 3,3-dimethylpropylamine, and cyclohexylamine. Other volatile basic materials may also be used. Exemplary volatile acids for use as the volatile color activator in combination with the foregoing pH sensitive dyes include but are not limited to formic acid, acetic acid, and trifluoroacetic acid. Other volatile acidic materials may also be used.

Carrier and Core Solvent

In embodiments where the irreversible thermochromic ink compositions contain irreversible thermochromic pigment capsules as disclosed herein, the core typically includes a solvent to solvate the volatile color activator and the color change dye capable of becoming substantially colorless upon evaporation of the volatile color activator. The core solvent is preferably a volatile solvent. The core solvent should be selected so as not to solvate the thermochromic pigment capsules.

Further, in such embodiments, the irreversible thermochromic pigment capsules are dispersed in a carrier, the carrier most often comprising a solvent. The carrier includes a solvent, a resin, or a mixture thereof. The carrier solvent is also preferably a volatile solvent. The carrier solvent should be selected so as not to solvate the thermochromic pigment capsules.

The irreversible thermochromic ink compositions also typically contain a solvent when the volatile color activator and a color change dye capable of becoming substantially colorless upon evaporation of the volatile color activator are (directly) dissolved and/or dispersed in a carrier (e.g., embodiments in which the color activator and color change dye are not encapsulated). The carrier solvent is typically a volatile solvent. The ink composition may further include a resin dissolved or dispersed in the carrier solvent.

Generally, each of the core and carrier solvents are not limited and may be aqueous, organic, polar, or non-polar provided that the color change dye is sufficiently soluble therein. Because relatively higher boiling point solvents will serve as a heat sink and thus impede evaporation of the volatile color activator, however, lower boiling point solvents are generally preferred. Preferred solvents have boiling points less than about 300° C., less than about 250° C., such as between about 40° C. and about 250° C., and/or between about 50° C. and about 220° C.

Representative solvents include but are not limited to hydrocarbons and halo-substituted hydrocarbons. Exemplary hydrocarbons include volatile branched chain hydrocarbons having from about 4 to about 30 carbon atoms, preferably from about 4 to about 20 carbon atoms, more preferably from about 6 to about 20 carbon atoms. Such hydrocarbons include, for example, isoparaffins commercially available from Exxon Chemical Company (Baytown, Tex. U.S.A.), as ISOPAR M (C13-C14 Isoparaffin), ISOPAR C (C7-C8 Isoparaffin), ISOPAR E (C8-C9 Isoparaffin), ISOPAR G (C10-C11 Isoparaffin), ISOPAR L (C11-C13 Isoparaffin), ISOPAR H (C11-C12 Isoparaffin). Other non-limiting examples of suitable branched chain hydrocarbons are commercially available from Presperse, Inc. (South Plainfield, N.J.) as PERMETHYL 99A (isododecane), PERMETHYL 102A (isoeicosane), and PERMETHYL 101A (isohexadecane). Other non-limiting examples of suitable branched chain hydrocarbons include petroleum distillates such as those available from Phillips Chemical as SOLTROL 130, SOLTROL 170, and those available from Shell as SHELL SOL 70, SHELL SOL 71, and SHELL SOL 2033. Additional suitable hydrocarbons include dodecane, octane, decane, hydrogenated polyisobutanes and combinations thereof. For example, the NORPAR series of paraffins available from Exxon Chemical Company such as NORPAR 12, NORPAR 13, and NORPAR 15 can be used as the carrier solvent. Yet another example includes C11-C15 alkanes/cycloalkanes, such as those available from Exxon as EXXSOL™ D80.

Thermochromic Capsules

The thermochromic capsules include a core (generally corresponding to an interior/center of the capsules) and a shell which provides a continuous, exterior surface that encapsulates and contains the core components, which are typically liquid. The core contains at least a volatile color activator and a color change dye that becomes substantially colorless upon evaporation of the volatile color activator. The core can also include a solvent, a resin, or mixtures thereof. Resins which are often relatively reactive can be excluded such that the core is substantially free of (dissolved/solvated) resin (e.g., the core contains less than about 1 wt. % resin, less than about 0.50 wt. % resin, less than about 0.25 wt. % resin, based on the total weight of the thermochromic capsule).

The thermochromic capsule shells generally comprise about 5 wt. % to about 30 wt. % of the capsule based on the weight of the entire capsule, with the core components comprising the balance. To achieve sufficient color intensity in written markings, the thermochromic ink compositions typically contain at least about 30 wt. %, at least about 40 wt. %, at least about 50 wt. %, for example, between about 20 wt. % and about 60 wt. %, between about 30 wt. % and about 50 wt. %, and/or between about 35 wt. % and about 45 wt. % of the thermochromic capsules based on the total weight of the thermochromic ink composition.

The particle size (or diameter) of the capsule can vary in different applicators. For example, for thermochromic ink compositions for use in ball pens, thermochromic capsules having a diameter of between about 0 microns and about 5 microns, between about 0 microns and about 3 microns, and/or between about 0 microns and 1 micron are highly desirable. For thermochromic ink compositions for use in markers, thermochromic capsules having a diameter between about 1 micron and about 30 microns, between about 3 microns and about 25 microns, and/or between about 5 microns and about 15 microns can be used. For thermochromic ink compositions for use with stamps, capsules having a diameter in excess of 100 microns are typically preferred, for example, thermochromic capsules having a diameter between about 100 microns and about 500 microns.

The shell is preferably frangible and thus fabricated to rupture rather than plastically deform when pressure is applied thereto. The shell does not typically rupture into multiple fragments but does rupture (or burst) upon application of pressure such that the components therein are exposed to atmospheric conditions. As a result, upon application of a force directing component to a written mark made with an ink composition comprising thermochromic capsules, a portion of the thermochromic capsules are ruptured, thereby allowing the volatile color activator to evaporate from the ruptured thermochromic capsules such that the color change dye becomes substantially colorless. A typical force directing component comprises an eraser such as those conventionally used in conjunction with writing instruments. Any material capable of directing a force to a substrate including but not limited to (relatively harder) thermoplastic materials, thermoplastic elastomers, metals, and wood can be used. The heat and/or friction generated by contacting the substrate with the force directing component to erase the written mark can facilitate evaporation of the volatile color activator, thereby promoting the intended color change. Preferably, the capsules rupture under a force of less than about 25 psi (172.4 kilopascals), less than about 20 psi (137.9 kilopascals), and/or less than 10 psi (69.0 kilopascals). Of course, the capsules are typically manufactured such that a user would easily be able to apply the force directing component to the a written mark made with an ink composition including thermochromic capsules to easily break apart the capsules, thereby releasing the volatile color activator from the capsules such that it can evaporate. As described throughout the application, after the released/exposed volatile color activator evaporates, the color change dye typically becomes substantially colorless.

The shell is typically formed of a polymer. The shell can also be formed of other materials including but not limited to gum Arabic, gelatin, ethylcelluloses, poly(lactide)s, poly(lactide-glycolide)s (i.e., poly(lactic-co-glycolic acid), urea-formaldehyde condensates, and maltodextrins. Other exemplary polymers for the shell include but are not limited to polyureas, polyamides, polyesters, polyurethanes, mixtures thereof, and other similar polycondensation products, which may have optionally incorporated within their polymer structures certain soft and flexible segments such as polyether or polymethylene moiety.

The shell material may influence which microencapsulation techniques would be most efficient for forming the thermochromic capsules. Suitable encapsulation processes include known chemical and physical methods for forming polymeric capsules. Representative examples of chemical methods include complex coacervation, interfacial polymerization (IFP), polymer-polymer incompatibility, in-situ polymerization, centrifugal force process, and submerged nozzle process. Representative examples of physical methods include spray drying, fluid bed coating, centrifugal extrusion, and rotational suspension separation. The selected encapsulation method depends on the requirement of the thermochromic capsule size, which in turn is dependent on the application method and applicator (as explained in further detail below).

In a representative coacervation process, the core component(s) which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. U.S. Pat. No. 7,736,695 discloses such a process and is incorporated herein by reference in its entirety.

In a representative interfacial polymerization process, a microcapsule wall of a polyamide, an epoxy resin, a polyurethane, a polyurea or the like is formed at an interface between two phases. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization. U.S. Pat. No. 4,622,267 the entirety of which is incorporated herein by reference discloses an interfacial polymerization technique for preparation of microcapsules in which the core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429, also incorporated herein by reference in its entirety.

U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner.

The shell can be formed, for example, by polymerizing oil-soluble monomers (precursors). Depending on the process, the oil soluble shell forming precursors present in the microdroplet phase during the microencapsulation process are preferably comprised of diisocyanates, diacyl chloride, and bischloroformate having soft and flexible moieties such as polymethylene or polyether segments within their molecular structures. Optionally, appropriate polyfunctional crosslinking agents, such as triisocyanate or triacyl chloride, in effective amounts, such as, for example, from about 1 weight percent to about 25 weight percent, can also be added to generate crosslinked shell polymers to improve their mechanical strength. Illustrative examples of the shell precursors include the polyether-based polyisocyanate such as Uniroyal Chemical's diphenylmethane diisocyanate-based liquid polyether VIBRATHANES® B-635 and B-843 and toluene diisocyanate-based liquid polyether VIBRATHANES® B-604 and B-614, and Mobay Chemical Corporation's liquid polyether isocyanate prepolymers, E-21 or E-21A, 743, 744, adipoyl chloride, fumaryl chloride, suberoyl chloride, succinyl chloride, phthaloyl chloride, isophthaloyl chloride, terephthaloyl chloride, ethylene glycol bischloroformate, diethylene glycol bischloroformate, and triethylene glycol bischloroformate. In addition, other polyfunctional reagents can also be added as co-reactants to improve shell properties such as mechanical strength and pressure sensitivity. In one embodiment, the aforementioned co-reactants can be selected from the group consisting of benzene diisocyanate, toluene diisocyanate, diphenylmethane diisocyanate, 1,6-hexamethylene diisocyanate, bis(4-isocyanatocyclohexyl)methane, MONDUR® CB-60, MONDUR® CB-75, MONDUR® MR, MONDUR® MRS 10, PAPI® 27, PAPI® 135, ISONATE® 143L, ISONATE® 181, ISONATE® 125M, ISONATE® 191, and ISONATE® 240.

The shell can also be formed, for example, by polymerizing water-soluble monomers. Water-soluble shell forming monomer components can be added to an aqueous phase including polyamine or polyol including bisphenol. Illustrative examples of the water-soluble shell monomers include ethylenediamine, tetramethylenediamine, pentamethylenediamine, 2-methylpentamethylene diamine, hexamethylenediamine, p-phenylenediamine, m-phenylenediamine, 2-hydroxy trimethylenediamine, diethylenetriamine, triethylenetetraamine, tetraethylenepentaamine, 1,8-diaminooctane, xylylene diamine, bis(hexamethylene)triamine, tris(2-aminoethyl)amine, 4,4'-methylene bis(cyclohexylamine), bis(3-aminopropyl)ethylene diamine, 1,3-bis(aminomethyl) cyclohexane, 1,5-diamino-2-methylpentane, piperazine, 2-methylpiperazine, 2,5-dimethylpiperazine, 1,4-bis(3-aminopropyl) piperazine, and 2,5-dimethylpentamethylene diamine, bisphenol A, and bisphenol Z. When desired, a water soluble crosslinking component such as triamine or triol can also be added in effective amounts sufficient to introduce crosslinking into the shell polymer structure to enhance its mechanical strength.

In each of the foregoing techniques, capsule thickness can be controlled in view of the (intended) final capsule size and pressure needed to rupture the capsule. If the capsule wall thickness is too high such that it results in a relatively large particle size (at least with respect to the system used to apply an ink composition containing the capsule), the thermochromic capsule may not be able to pass through the writing point or fibrous reservoir of a writing instrument containing the thermochromic ink. On the other hand, if the shell thickness is too little, the capsule may be ruptured prematurely during the ink deposition process. Persons having ordinary skill in this art are able to balance these considerations appropriately. The thermochromic capsule shells typically have a wall thickness generally, for example, of less than about 5 microns, but greater than about 0.5 microns, for example, between about 0.5 microns and 2 microns.

Additives

All ink compositions disclosed herein can include other additives. Preferred additives include, for example, biocide(s), surface tension modifier(s), other synergistic resin(s), surfactant(s), humectant(s), dispersing agent(s), and other additives known in the art. These additives can be added to the ink composition and/or included in the core of the thermochromic capsules, if encapsulation is employed. The additives can be added in any amount such that the overall performance of the ink compositions is not adversely affected in any aspect.

The disclosed irreversible thermochromic ink compositions can be used in a variety of applicators writing instruments such as ball point pens, fountain pens, and markers, printers and print cartridges, and stamps.

The following examples are provided for illustration and are not in any way to limit the scope of the invention.

EXAMPLE 1

One part Crystal Violet Lactone (Aldrich Chemical, Milwaukee, Wis.), four parts nonylphenol (Dover Chemical, Hammond, Ind.), and 5 parts SAS-310 (Nisseki Chemical, Houston, Tex.) were mixed to generate a deep blue solution. The blue solution was loaded into a SHARPIE® marker (Sanford LP, Oakbrook, Ill.) including a nib in fluid communication with a fibrous reservoir that produced blue colored written marks. The marks were subjected to temperature between 100° C. and 150° C. for one minute and blue color of the written marks was removed. The substrate bearing the now colorless marks were then subjected to −10° C. for 30 minutes. The color of the written marks was not regenerated. Thus, the foregoing example demonstrates the irreversibility of the color change in the disclosed ink compositions.

EXAMPLE 2

One part PERGASCRIPT® Red I-6B (BASF, Florham Park, N.J.), four parts nonylphenol (Dover Chemical, Hammond, Ind.), and 5 parts SAS-310 (Nisseki Chemical, Houston, Tex.) were mixed to generate a red solution. The red solution was loaded into a SHARPIE® marker (Sanford LP, Oakbrook, Ill.) including a nib in fluid communication with a fibrous reservoir that produced red colored written marks. The marks were subjected to temperature between 100° C. and 150° C. for one minute and red color of the written marks was removed. The substrate bearing the now colorless marks were then subjected to −10° C. for 30 minutes. The color of the written marks was not regenerated. Thus, the foregoing example further demonstrates the irreversibility of the color change in the disclosed ink compositions.

Although the foregoing description is a detailed description of a numerous different embodiments of irreversible thermochromic ink compositions, the detailed description is to be construed as exemplary only and does not describe every possible embodiment of an irreversible thermochromic ink composition in accordance with the disclosure.

What is claimed:

1. An irreversible thermochromic ink comprising:
a carrier and thermochromic capsules dispersed in the carrier, the thermochromic capsules comprising a shell and a core, the core comprising a volatile color activator and a color change dye capable of becoming substantially colorless upon evaporation of the volatile color activator.

2. The irreversible thermochromic ink of claim 1, wherein the color change dye comprises a leuco dye.

3. The irreversible thermochromic ink claim 1, wherein the volatile color activator has a boiling point between about 50° C. and about 300° C.

4. The irreversible thermochromic ink of claim 1, wherein the volatile color activator comprises a volatile phenolic compound.

5. The irreversible thermochromic ink of claim 1, wherein the shell comprises a polymer.

6. The irreversible thermochromic ink of claim 1, wherein the shell is frangible.

7. The irreversible thermochromic ink of claim 1, wherein the color change dye comprises a pH sensitive dye.

8. The irreversible thermochromic ink of claim 7, wherein the volatile color activator comprises a volatile acid or a volatile base.

9. The irreversible thermochromic ink of claim 1, wherein the ink contains between about 20 wt. % and about 60 wt. % of the thermochromic capsules based on the total weight of the thermochromic ink composition.

10. The irreversible thermochromic ink of claim 1, wherein the carrier comprises a volatile solvent.

11. The irreversible thermochromic ink of claim 1, wherein the core comprises a volatile solvent.

12. An irreversible thermochromic pigment capsule comprising a shell and a core, the core comprising a volatile color activator and a color change dye capable of becoming substantially colorless upon evaporation of the volatile color activator.

13. The irreversible thermochromic pigment capsule of claim 12, wherein the color change dye comprises a leuco dye.

14. The irreversible thermochromic pigment capsule of claim 12, wherein the volatile color activator comprises a volatile phenolic compound.

15. The irreversible thermochromic pigment capsule of claim 12, wherein the color change dye comprises a pH sensitive dye.

16. The irreversible thermochromic pigment capsule of claim 15, wherein the volatile color activator comprises a volatile acid or a volatile base.

17. A method of erasing a written mark comprising:
making a written mark with the thermochromic ink of claim 1, the written mark providing a coating comprising a plurality of thermochromic capsules; and,
applying a force directing component to the written mark to rupture a portion of the thermochromic capsules, thereby allowing the volatile color activator to evaporate from the ruptured thermochromic capsules such that the color change dye becomes substantially colorless.

18. The method of claim 17, further comprising applying a heat source to the written mark.

19. A writing instrument comprising the irreversible thermochromic ink composition of any of claim 1.

* * * * *